US012748172B2

(12) United States Patent
Moline et al.

(10) Patent No.: US 12,748,172 B2
(45) Date of Patent: Sep. 29, 2026

(54) DEVICE FOR ESTIMATING A DIRECTION POINTING TOWARD AN IRRADIATING SOURCE

(71) Applicant: COMMISSARIAT À L'ENERGIE ATOMIQUE ET AUX ENERGIES ALTERNATIVES, Paris (FR)

(72) Inventors: Yoann Moline, Gif-sur-Yvette (FR); Gwenolé Corre, Gif-sur-Yvette (FR); Jordan Gameiro, Gif-sur-Yvette (FR); Clément Lynde, Gif-sur-Yvette (FR); Romuald Woo, Gif-sur-Yvette (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 142 days.

(21) Appl. No.: 18/724,956

(22) PCT Filed: Dec. 25, 2022

(86) PCT No.: PCT/EP2022/087838

§ 371 (c)(1),
(2) Date: Jun. 27, 2024

(87) PCT Pub. No.: WO2023/126381

PCT Pub. Date: Jul. 6, 2023

(65) Prior Publication Data

US 2025/0102610 A1 Mar. 27, 2025

(30) Foreign Application Priority Data

Dec. 27, 2021 (FR) ...................................... 2114564

(51) Int. Cl.

| | |
|---|---|
| ***G01S 3/78*** | (2006.01) |
| ***G01T 1/29*** | (2006.01) |
| ***G01T 7/00*** | (2006.01) |

(52) U.S. Cl.

CPC .......... *G01S 3/7806* (2013.01); *G01T 1/2907* (2013.01); *G01T 7/00* (2013.01)

(58) Field of Classification Search

None

See application file for complete search history.

(56) References Cited

U.S. PATENT DOCUMENTS 5,345,084 A * 9/1994 Byrd ......................... G01T 3/06 250/366

5,592,285 A * 1/1997 Pund ....................... G01S 3/785 356/400

(Continued)

FOREIGN PATENT DOCUMENTS

CN 109655875 A 4/2019

OTHER PUBLICATIONS

International Search Report issued Apr. 12, 2023 in PCT/EP2022/087838, filed on Dec. 25, 2022, 2 pages.

*Primary Examiner* — Marcus H Taningco

(74) *Attorney, Agent, or Firm* — Oblon, McClelland, Maier & Neustadt, L.L.P.

(57) ABSTRACT

A device for estimating a position of a radioactive source, comprising: a holder; and at least two radiation detectors configured to generate a detection signal, the device being such that, each detector being assigned a position, the detectors are placed around an iso-centroid of each position, i.e., a centroid of each position equally weighted. The device also includes processing circuitry configured to compute a centroid of each position weighted by the detection signal measured by each detector; and depending on the centroid, estimate a direction pointing toward the source, corresponding to a direction between the device and the source.

14 Claims, 9 Drawing Sheets

(56) References Cited

U.S. PATENT DOCUMENTS

| | | | | |
|---|---|---|---|---|
| 6,333,503 | B1 * | 12/2001 | Chapuis | G01T 1/1642 250/369 |
| 10,024,981 | B2 * | 7/2018 | Farsoni | G01T 1/2018 |
| 10,101,472 | B1 | 10/2018 | Newman | |
| 2008/0036585 | A1 * | 2/2008 | Gould | G01T 7/00 340/539.2 |
| 2020/0241152 | A1 * | 7/2020 | Newman | A23N 17/02 |

* cited by examiner

DEVICE FOR ESTIMATING A DIRECTION POINTING TOWARD AN IRRADIATING SOURCE

TECHNICAL FIELD

The technical field of the invention relates to estimation of a direction between a detecting device and a detected radioactive source. The detecting device forms a compass, pointing toward the radioactive source.

PRIOR ART

Determining a position of a radiant radioactive source in an environment can be a tedious operation. It is an operation liable to need to be carried out in nuclear installations, for radiation-protection purposes, or to control suspicious goods or waste, at borders for example.

A first option consists in using a radiation-measuring device such as those usually used in the field of radiation protection. This type of device allows an ambient radiation level to be measured, but provides no information on the position of the sources generating the radiation. Locating a radiation source requires a spatial scan while regular measurements are performed, in the hope of gradually getting closer to the source depending on the successively measured radiation levels. Such an operation is time-consuming, and therefore disadvantageous from the point of view of dose. The main advantage of this approach is that it employs measuring means that are inexpensive, simple to use and widely available.

Another option is to use an imager, such as a gamma camera. A gamma camera is a device that allows an image of an observed scene to be formed, in which image the main radioactive sources may be located. This type of device has been undergoing improvement since the 1990s and has reached industrial maturity. Compact and relatively light gamma cameras are currently commercially available. However, gamma cameras are expensive devices, requiring a certain level of know-how to use.

U.S. Pat. No. 10,024,981B2 describes a measuring device borne by a drone, and intended to locate a radioactive source using a plurality of detectors. The source is located by comparing signals detected simultaneously by a plurality of detectors. However, the location is inexact, because it results from a simple comparison of the intensities of the measured signals.

The inventor has designed a device that operates like a compass, allowing a direction pointing toward a radioactive source to be indicated. The device is of simple design, and allows directional information to be obtained. It is also a device that is inexpensive, and simple to use.

SUMMARY OF THE INVENTION

A first subject of the invention is a device for estimating a direction pointing toward a radioactive source, the radioactive source emitting radiation composed of gamma particles or X-rays or neutrons, the device comprising:

- a holder;
- at least two radiation detectors, each detector being configured to generate a detection signal depending on the number of particles detected by the detector; the device being such that each detector is assigned a position, the detectors being placed around a center corresponding to what is referred to as an iso-centroid of each position, i.e. a centroid of each position equally weighted, the device comprising a processing unit configured to
- compute a centroid of each position weighted by the detection signal measured by the detector occupying said position;
- depending on the centroid, estimate a direction pointing toward the radioactive source, corresponding to a direction between the device and the radioactive source.

According to one embodiment, the device comprises at least three non-aligned detectors.

According to one embodiment, the processing unit is configured to:

- store the detection signals of the detectors at a first time;
- store the detection signals of the detectors at a second time, after the first time;
- take into account a position of each detector at the first time and at the second time;
- compute the centroid of the respective positions of the detectors at each time, weighted by the detection signals measured by each detector at each time, respectively.

The device may comprise an orienting unit, configured to estimate a change in the position of the detectors between the first time and the second time.

The device may comprise a display unit, connected to the processing unit, and configured to display the direction pointing toward the radioactive source.

At least one detector or each detector may comprise a detection scintillator. At least one detector or each detector may comprise an inorganic detection scintillator.

According to one embodiment, the processing unit is configured to:

- take into account a distance of movement of the device between two successive measurement times, in the direction pointing toward the radioactive source;
- measure the detection signals generated by a detector of the device at the two successive measurement times;
- estimate a distance between the device and the source depending on the distance of movement and on the detection signals measured at each time.

The device may comprise a geolocating unit, configured to measure the distance of movement of the device between the two successive measurement times.

A second subject of the invention is a method for determining a direction pointing toward a radioactive source using a device according to the first subject of the invention, the method comprising the following steps:

- a) measuring detection signals with each detector;
- b) computing a centroid of each position weighted by the detection signal measured by the detector occupying said position;
- c) estimating the direction pointing toward the source depending on the computed centroid.

According to one embodiment:

- step a) comprises:
  - measuring a detection signal resulting from at least two detectors at a first time;
  - measuring the detection signal resulting from said detectors at a second time;
- step b) comprises taking into account a position of each detector at the first time and at the second time;
- step c) comprises computing a centroid of the respective positions of the detectors at each time, weighted by the detection signals measured by each detector at each time, respectively.

Between the first time and the second time the device may rotate about the iso-centroid, the angle of rotation being predetermined and/or measured.

The method may comprise a step of displaying the direction pointing toward the radioactive source.

According to one embodiment, the method comprises steps of:

d) moving the device between two positions along the direction pointing toward the source, by a distance of movement;

e) at each position, measuring a detection signal by means of a detector;

f) taking into account the distance of movement and the detection signal measured at each position to estimate a distance between the radioactive source and the device.

The method may comprise steps of:

g) comparing the distance between the source and the device, estimated in step f), with a predetermined threshold distance;

h) depending on the comparison, validating or invalidating the estimated distance between the radioactive source and the device.

A third subject of the invention is a device for estimating a distance with respect to a radioactive source, the radioactive source emitting radiation composed of gamma particles or X-rays or neutrons, the device comprising:

a holder;

a radiation detector configured to generate a detection signal depending on the number of particles detected by the detector;

the device being such that it comprises a processing unit, configured to store the detection signals resulting from the detector at two successive times;

take into account a distance of movement of the device between the two successive times;

estimate a distance between the device and the radioactive source based on the stored detection signals and on the distance of movement taken into account.

A fourth subject of the invention is a method for estimating a distance between a radioactive source and a device according to the third subject of the invention, comprising:

a) taking into account a direction pointing toward the radioactive source;

b) moving the device between two positions along the direction pointing toward the source, by a distance of movement;

c) at each position, measuring a detection signal by means of the detector;

d) taking into account the distance of movement and the detection signal measured at each position to estimate a distance between the radioactive source and the device.

The invention will be better understood on reading the description of the examples of embodiment that are presented, in the rest of the description, with reference to the figures listed below.

FIGURES

FIGS. 1A and 1B schematically show a first embodiment. FIG. 1A is a perspective view and FIG. 1B is a view from above.

FIGS. 2A and 2B illustrate one possibility in respect of implementation of the first embodiment. These two figures are views from above.

FIGS. 3A and 3B schematically show a second embodiment. FIG. 3A is a perspective view and FIG. 3B is a view from above.

FIG. 4 shows one example of a portable device according to the second embodiment.

FIG. 5 schematically shows an experimental trial carried out using a device according to the second embodiment.

FIGS. 6A and 6B show the use of a device to locate a radioactive source in three dimensions.

FIG. 7 schematically shows a simulation carried out using a device according to the first embodiment.

Figure 10:
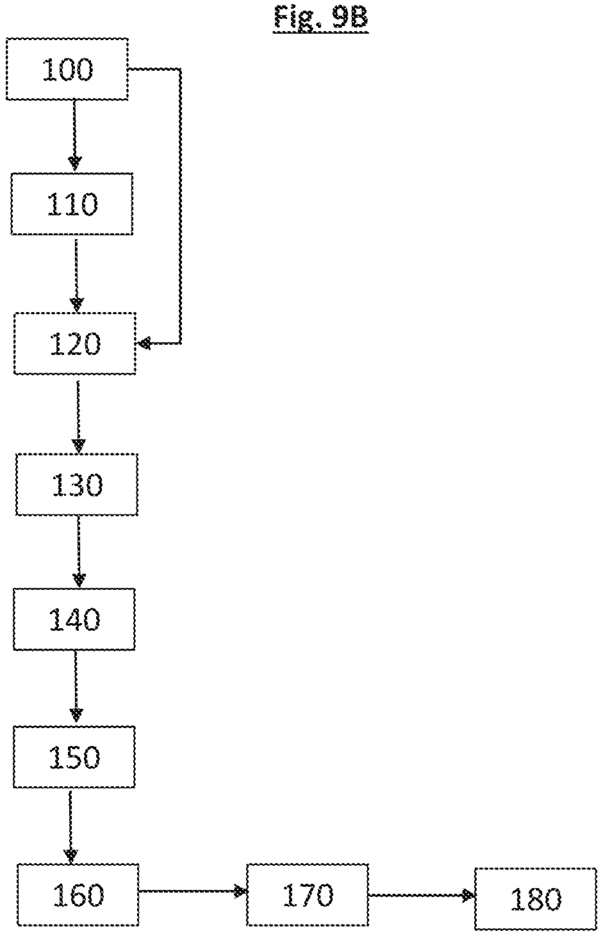

FIG. 10 summarizes various stages of implementation of a device forming one subject of the invention.

DESCRIPTION OF PARTICULAR EMBODIMENTS

Figure 1A:
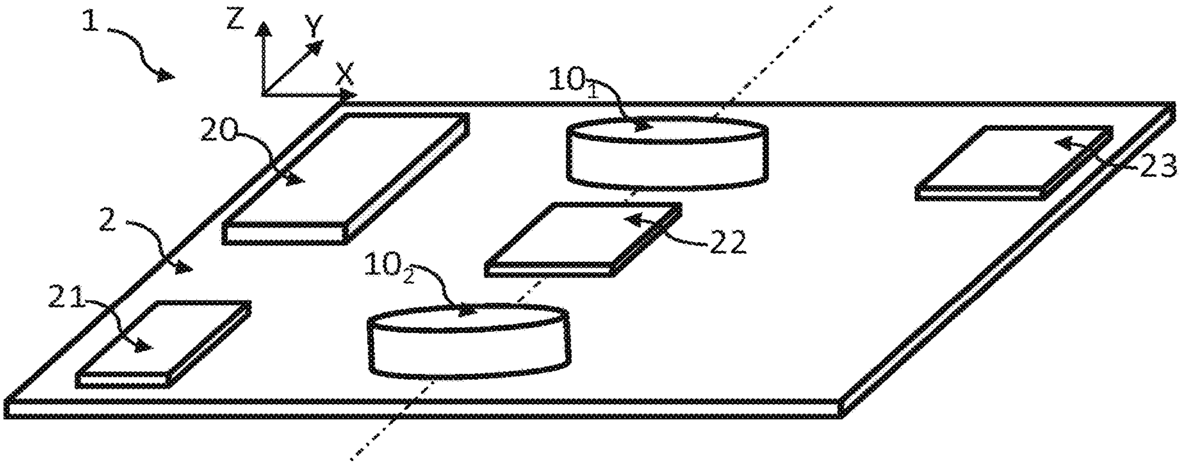
Figure 1B:
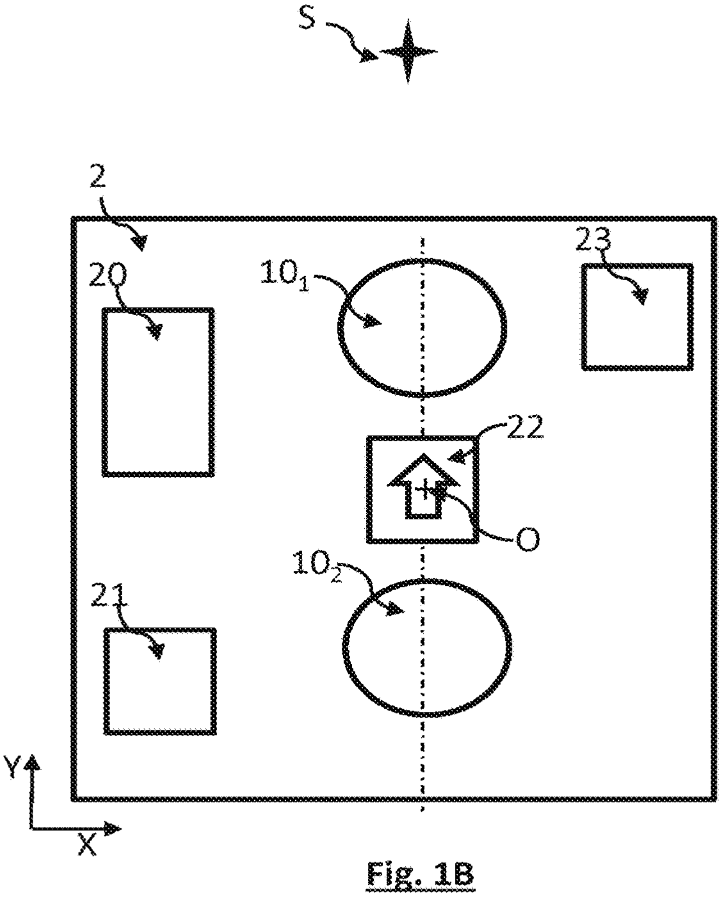

FIGS. 1A and 1B show a first embodiment of a device 1 according to the invention. The device is intended to determine an orientation of a radioactive source S, placed at a distance from the device, and to determine a rectilinear direction pointing toward the source, from the device. The radioactive source S is typically positioned a few meters from the device. It may be a source radiating photons (X-ray or gamma photons) and/or neutrons.

Use of the device presupposes that the radioactive source is placed at a distance such that, in view of its activity, the radiation incident on the device is sufficient to be detected.

In the examples shown, the device is intended to be borne by a user, so as to indicate the direction pointing toward the source. It is therefore a device intended to be used nomadically. Alternatively, as described below, the device may be mounted on a vehicle, in particular in the context of deployment in hostile environments.

The device 1 comprises a holder 2 on which a plurality of detectors $\mathbf{10}_1$, $\mathbf{10}_2$ are placed. Each detector is configured to detect ionizing radiation, in particular neutrons or X-ray or gamma photons.

Each detector is formed from a detection material connected to a detecting circuit. Under the effect of an interaction in the detection material, a particle forming the ionizing radiation (neutron or X-ray or gamma photon) generates an electrical pulse, the latter being detected by the detecting circuit. When the detection material is a scintillator, the electrical pulse is generated by a photodetector coupled to the detection material. When the detection material is a semiconductor, the electrical impulse results from collection of charge carriers created in the material under the effect of the interaction. The detecting circuit allows a count rate to be established, which corresponds to a number of pulses detected per unit of time. For example, a number of pulses per second, usually referred to as the "counts per second", is established. Alternatively, the detecting circuit allows a count to be established, which corresponds to a number of pulses detected during a given length of measurement time.

Generally, the detecting circuit allows a detection signal to be formed, the latter corresponding either to a count rate or to a count. In the examples described below, the detection signal is a count rate.

Preferably, the detection material of each detector is solid. It may in particular be a scintillator. When the particles forming the radiation are photons, inorganic scintillator materials are preferred, due to their high atomic number, which means they attenuate well. Among inorganic scintillators, mention may be made, non-limitingly, of NaI(TI), CsI(TI), GBO (bismuth germanate), $LaBr_3$, YSO(Ce) (yttrium orthosilicate: cerium—$Y_2SiO_5$:Ce), and $SrI_2$(Eu). When the particles forming the radiation are neutrons, organic scintillator materials are preferred, because of their high light-atom content.

In the example illustrated in FIG. 1A, the device is dedicated to detecting a source emitting gamma photons. Thus, the detectors are based on a detection material of inorganic-scintillator type.

The device also comprises:

- a processing unit 20, connected to each detector. The processing unit may comprise a computer, for example a field-programmable gate array (FPGA) or an application specific integrated circuit (ASIC) or a microprocessor, programmed to perform computations using the count rates generated by each respective detector. The processing unit is programmed to establish a direction, pointing toward the source, based on the count rates.
- an orienting unit 21, configured to measure an orientation of the device. For example, it may be a question of an inertial measurement unit. The orienting unit is optional.
- a display unit 22, for displaying the direction pointing toward the source. It may be a question of a screen or of a set of diodes. The display unit is optional.
- a geolocating unit 23, configured to establish a position of the device. For example, it may be a question of a GPS system when the device is used outdoors. It may be a question of a system using beacons emitting a short-range (Wi-Fi for example) electromagnetic signal when the device is used indoors. The geolocating unit is optional.

FIG. 1A shows a particularly simple configuration of the device 1. In this configuration, the device comprises only two detectors $\mathbf{10}_1$ and $\mathbf{10}_2$. FIG. 1B shows the device and source S viewed from above.

Based on the position of each detector on the holder 2, an iso-centroid O may be established. The iso-centroid O is a geometrical point located equidistant from each detector. To compute the iso-centroid, each detector $\mathbf{10}_i$ may be assigned a discrete position $P_i$, which corresponds to the center of the detector. i is a natural number designating each detector.

The processing unit 20 is configured to compute a centroid B of the position $P_i$ of each detector $\mathbf{10}_i$, weighted by the count rate measured by each detector, respectively. If $P_i$ designates a point on the holder associated with each detector $\mathbf{10}_i$, which may for example be the center of each detector, the centroid B is such that:

$$\sum_i N_i \overrightarrow{BP_i} = \vec{0} \tag{1}$$

$N_i$ corresponds to the count rate measured by the detector $\mathbf{10}_i$.

The vector $$\overrightarrow{OB}$$

points toward the source S. Thus, computation of the vector $$\overrightarrow{OB}$$

makes it possible to estimate a direction, pointing toward the source, from the device. The direction pointing toward the source may be displayed on the display unit 22. The device then operates in a manner equivalent to a compass. The display unit may comprise an arrow pointing toward the source.

Using only two detectors, a single measurement is not enough, because the direction obtained is necessarily parallel to the direction in which the detectors are aligned.

However, by rotating the device about an axis perpendicular to the holder and passing through the iso-centroid O, the vector $$\overrightarrow{OB}$$

may be computed a number of times and the orientation of the device for which the norm $$\|\overrightarrow{OB}\|$$

is maximum may be determined. In such an orientation, the detectors are aligned in the direction pointing toward the source.

When the detectors $\mathbf{10}_1$, $\mathbf{10}_2$ and the source S are aligned, the detector $\mathbf{10}_1$ forms a front detector and the detector $\mathbf{10}_2$ forms a rear detector. The front detector is interposed between the source and the rear detector. In this arrangement, the radiation emitted by the source and reaching the rear detector is attenuated by the front detector. Since the detection materials of the detectors are absorbent, in particular when they are inorganic detectors, the attenuation of the radiation by the front detector is significant. Thus, in this configuration, the discrepancy between the respective count rates measured by each detector is maximum. This maximizes the norm $$\|\overrightarrow{OB}\|$$

The display unit 22 may display an arrow the size of which is correlated to the norm $$\|\overrightarrow{OB}\|$$

The user may thus visually determine the orientation of the device maximizing the norm $$\|\overrightarrow{OB}\|$$

Alternatively, a numerical value, corresponding to the norm, is displayed on the display unit.

Figure 2A:
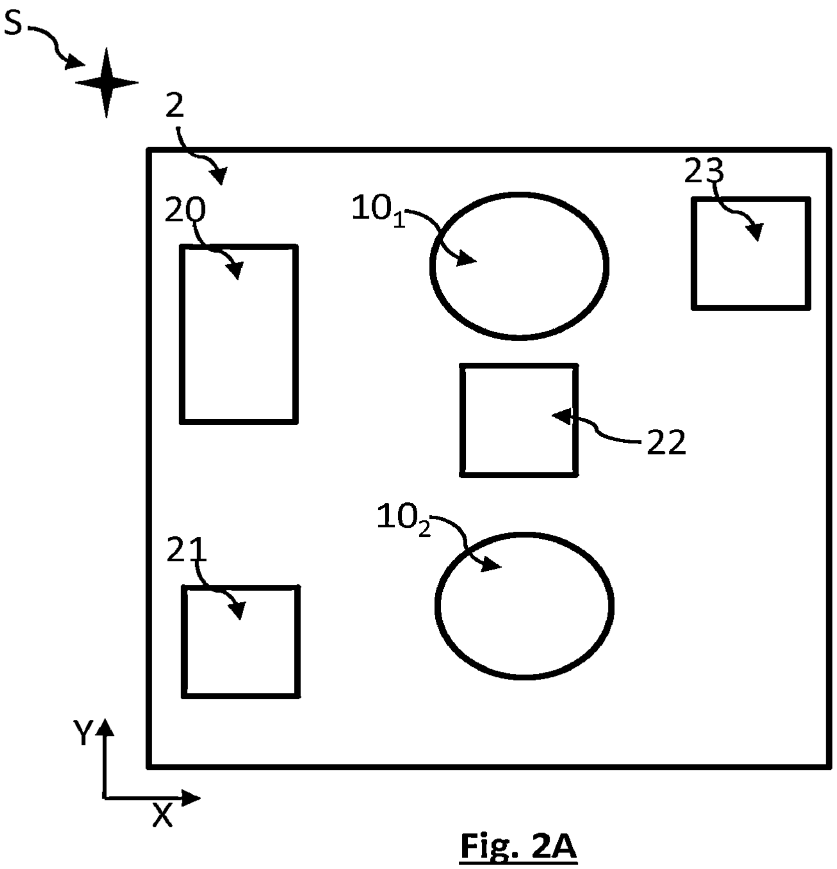
Figure 2B:
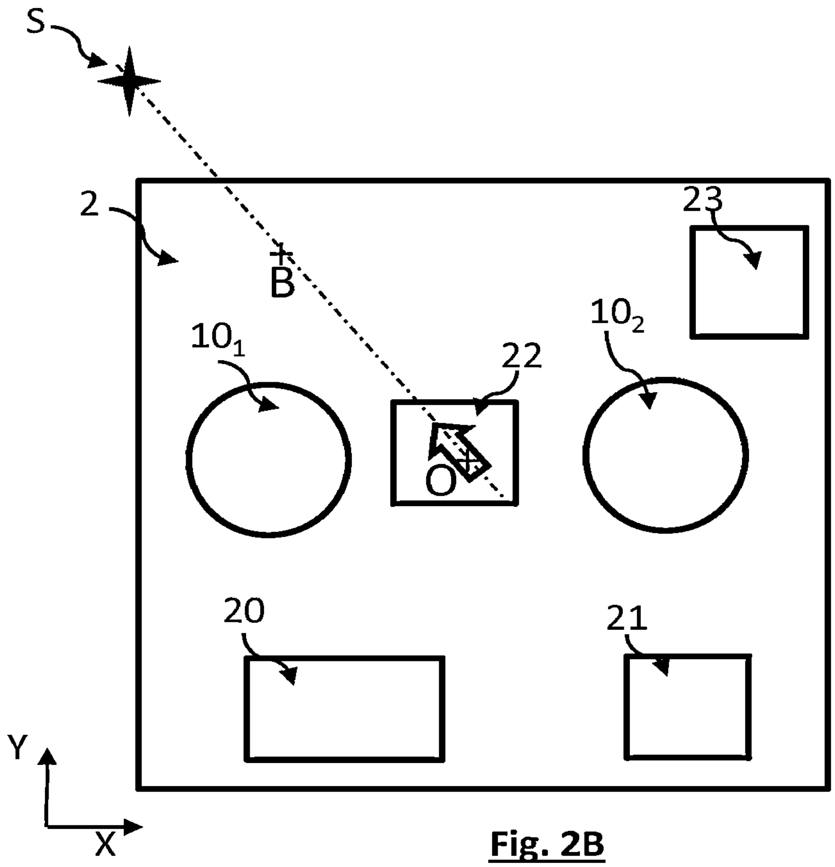

FIGS. 2A and 2B illustrate a simple method for determining the position of a source with respect to the device, using a device comprising at least two detectors. In the example shown, the device corresponds to the one described with reference to FIG. 1A: it comprises only two detectors. At a first time $t_1$, the device is placed so as to have a randomly chosen orientation, as shown in FIG. 2A. At a second time $t_2$, after the first time $t_1$, the device undergoes a rotation of 90°, about the iso-centroid O, with respect to the second time.

The processing unit 20 is configured to store the respective count rates at each measurement time and to compute a position of the centroid B.

$$\sum_i \sum_j N_i(t_j)\overrightarrow{BP_i} = \vec{0} \tag{2}$$

where $N_i(t_j)$ is the count rate of detector $\mathbf{10}_i$, occupying position $P_i(t_j)$, at measurement time $t_j$, with j varying between 1 and 2 in this example.

FIGS. 2A and 2B show the configuration of the device at the first time $t_1$ and at the second time $t_2$, respectively. The direction pointing toward the source is computed following the second time $t_2$.

According to one possibility, the device comprises an orienting unit 21 such as described above. In this case, the orienting unit 21 may be configured to detect, during the rotation of the device, when an angle of rotation of 90° with respect to the first time $t_1$ has been reached, and to carry out the measurements directly.

According to another possibility, the orienting unit 21 determines an angle of rotation between the first time and the second time. This allows a more precise computation of the position of the centroid B and avoids the need for the user to rotate through an angle close to 90°. The user may actuate a switch, so as to signal the first and second times to the processing unit. The orienting unit determines the angle between the first time and the second time and delivers it to the processing unit. The actual value of the angle is taken into account to compute the centroid. The rotation between the two times may thus be different from 90°. It may be 45° or 110°. However, it is preferable for the angle of rotation to be close to 90°.

Figure 3A:
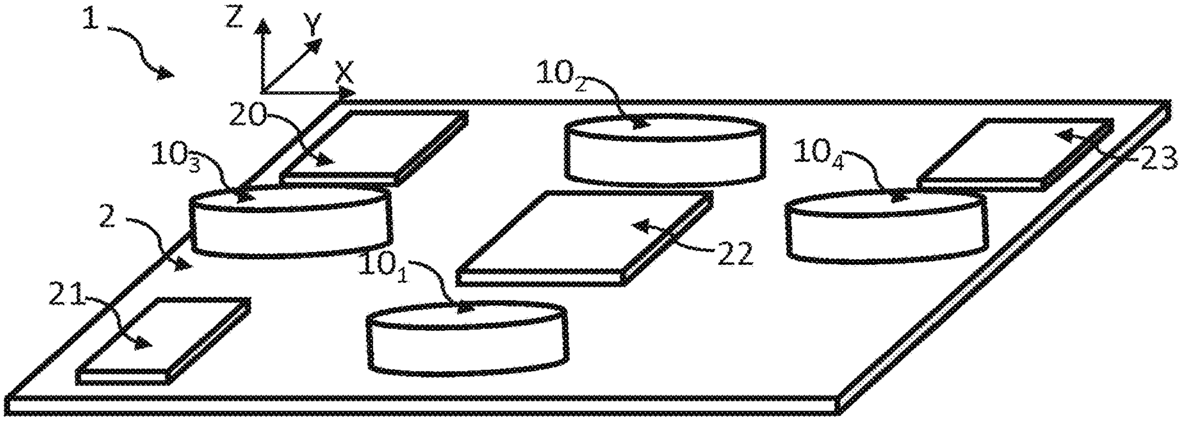
Figure 3B:
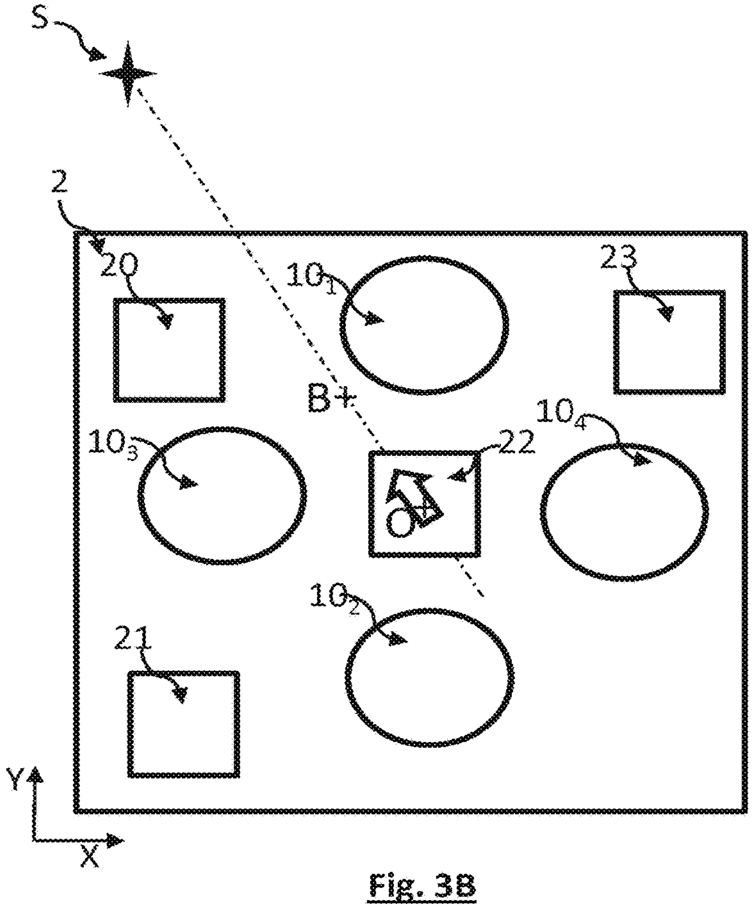

FIGS. 3A and 3B show an embodiment in which the device comprises four detectors regularly distributed around an iso-centroid O. With this type of device, the processing unit 20 is configured to compute the centroid of the positions of each detector, weighted by their respective count rates. This makes it possible to obtain a direction pointing toward the radioactive source without having to rotate the device. Such an embodiment works provided that the device comprises at least three non-aligned detectors. According to one possibility, the device comprises three detectors, preferably regularly distributed around a center, with an angular separation of 120°.

Whatever the configuration, when the radiation to be detected is gamma radiation, use of detectors based on inorganic materials maximizes absorption of some of the radiation emitted by the source by the detectors closest the source. This increases the contrast between the count rates measured by each detector. The centroid B is thus further away from the iso-centroid O, this increasing the accuracy of the direction estimated by the device. In order for the absorption resulting from one detector to be able to significantly influence the count rate of another detector, the distance between detectors is preferably less than 30 or 40 cm. In order for the effect of absorption to be more significant, it is preferable for the distance between the detectors to be less than 20 cm.

Figure 4:
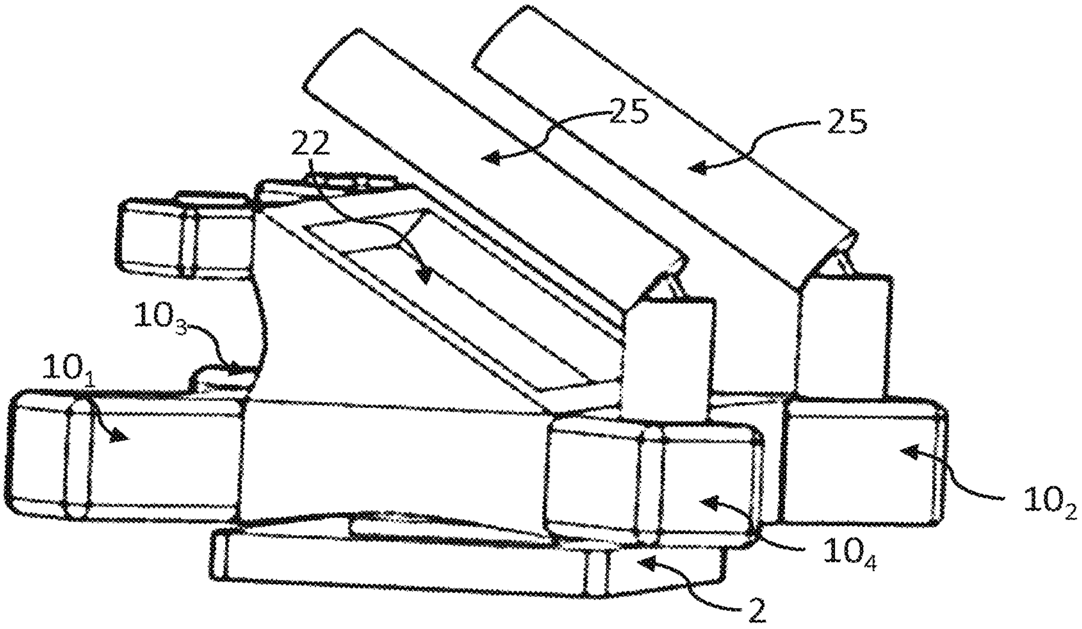

FIG. 4 schematically shows one embodiment similar to that of FIGS. 3A and 3B, based on four detectors lying around a center. The respective positions of each detector form a cross, the center of which corresponds to iso-centroid O. In the device shown in FIG. 4, the device comprises handles 25, making it easier to grip the device.

Figure 5:
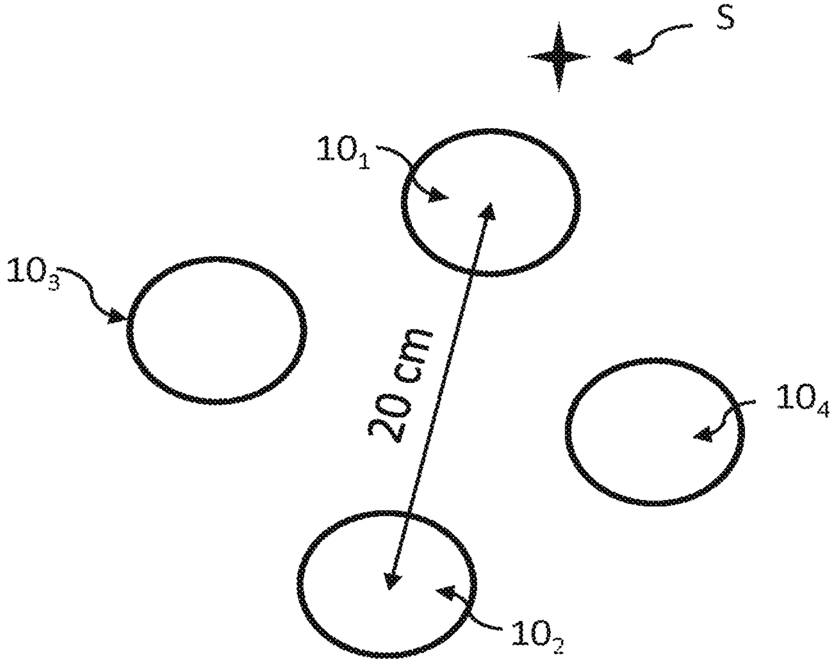

The inventor has carried out an experimental trial in which four detectors were arranged in the same horizontal plane, in a configuration similar to the one shown in FIGS. 3A and 3B. Each detector was composed of a NaI(TI) scintillator with a diameter of 50.8 mm and a height of 25.4 mm, i.e. a diameter of 2 inches and a height of 1 inch. The positions of each detector formed a square with a diagonal of 20 cm. See FIG. 5. A source of $^{137}$Cs with an activity of 500 kBq was placed at a distance of 5 cm from the closest detector. The following count rates were measured:

detector $\mathbf{10}_1$: 800 cps (counts per second);
detector $\mathbf{10}_2$: 150 cps;
detector $\mathbf{10}_3$: 240 cps;
detector $\mathbf{10}_4$: 250 cps;

The difference between the various count rates made it possible to determine, without difficulty, the direction pointing toward the source.

A configuration such as shown in FIG. 3B was modeled, each detector being a YSO detector with dimensions of 7.11 mm×7.11 mm×21.08 mm. The distance between two opposite detectors was 20 cm. A $^{137}$Cs source with an activity of $2.9\times10^9$ Bq placed at various distances from the device was simulated. The source was centered with respect to the device, in the XY plane. The distance between the $^{137}$Cs source and the device was varied. Table 1 shows the simulated count rates (counts per second) resulting from each detector, as a function of distance.

TABLE 1

| | 5 m | 4 m | 3 m | 2 m | 1 m |
|---|---|---|---|---|---|
| $10_3$ (left) | 187.61 | 293.15 | 521.15 | 1172.59 | 4690.35 |
| $10_1$ (front) | 205.37 | 320.90 | 570.48 | 1283.58 | 5134.33 |
| $10_4$ (right) | 190.29 | 297.33 | 528.59 | 1189.33 | 4757.32 |
| $10_2$ (rear) | 98.72 | 154.25 | 274.22 | 616.99 | 2467.95 |

It may be seen that the contrast observed between the front ($\mathbf{10}_1$) and rear ($\mathbf{10}_2$) detectors is high whatever the distance.

In another model, a $^{137}$Cs source such as described above placed 5 meters from the device was modeled. The material forming each detector was varied. Regardless of the material, each detector was cylindrical in size, and had a diameter and height equal to 25.4 mm. Table 2 shows the count rates estimated for each detector as a function of the detection materials, the latter being NaI(TI), BGO, $LaBr_3$(Ce), and $SrI_2$(Eu).

TABLE 2

| | NaI(Tl) | BGO | $LaBr_3$(Ce) | $SrI_2$(Eu) |
|---|---|---|---|---|
| $10_3$ (left) | 1958.49 | 3326.15 | 2454.65 | 2247.79 |
| $10_1$ (front) | 2064.44 | 3501.76 | 2577.38 | 2375.98 |
| $10_4$ (right) | 1987.16 | 3362.26 | 2486.10 | 2281.82 |
| $10_2$ (rear) | 963.66 | 568.30 | 909.89 | 949.59 |

It may be seen that the contrast between the front ($\mathbf{10}_1$) and rear ($\mathbf{10}_2$) detectors is particularly high for BGO or, to a lesser extent, $LaBr_3(Ce)$, because of their high atomic number, which is conducive to a strong attenuation of the photons.

Figure 6A:
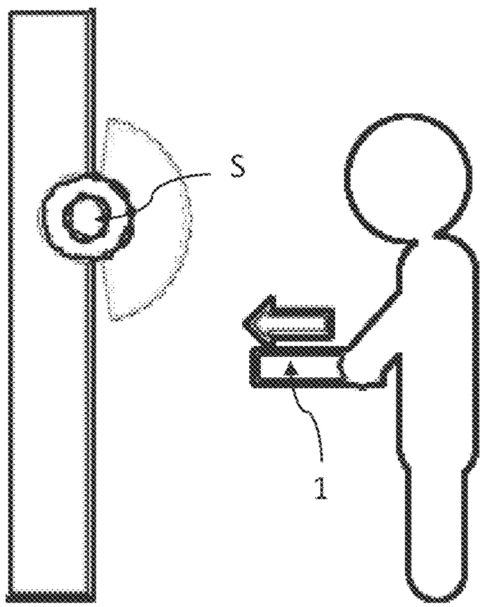
Figure 6B:
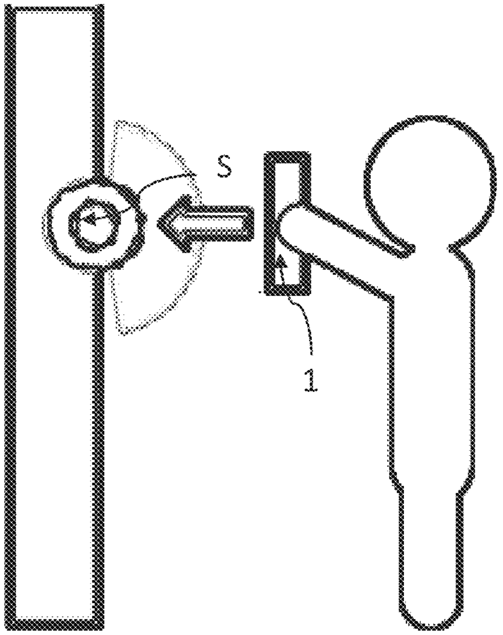

FIGS. 6A and 6B illustrate two possible ways of using the device. In FIG. 6A, the device is placed horizontally, parallel to the ground, so as to be able to estimate a direction pointing toward the source in the horizontal plane. In FIG. 6B, the device is placed vertically, for example parallel to a wall, so as to be able to estimate a direction pointing toward the source in the vertical plane. By combining these two orientations of the device, it is possible to estimate a 3D position of the source.

Figure 7:
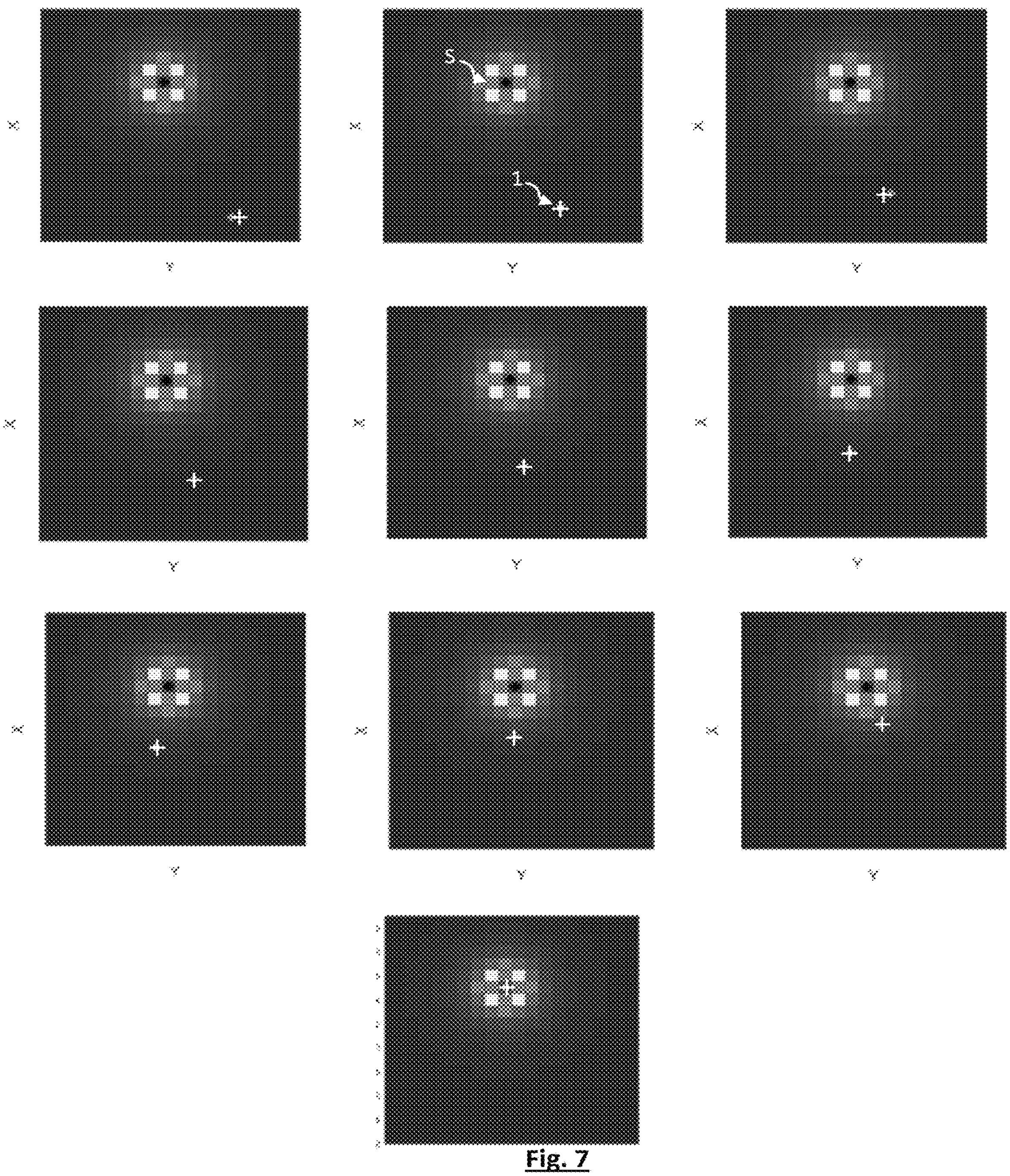

Operation of the device according to the embodiment described with reference to FIGS. 2A and 2B has been simulated. A source was randomly positioned in a plane. An initial position was randomly assigned to the device. A progression of the device in the plane between various measurement points was simulated. At each measurement point:

a centroid was computed after a rotation of the detector, so as to obtain 4 measurements at 4 different positions.

based on the computed centroid, a direction pointing toward the source was determined at each measurement point.

the device was moved by a predetermined spatial increment in the determined direction. FIG. 7 illustrates the progression of the device toward the source. The source is considered to have been reached when the direction pointing toward the source varies greatly as a result of a small movement of the device.

The embodiments described above make it possible to determine a direction pointing toward a radioactive source. The directional information may then be used to estimate a distance between the device and the source.

Assuming a point source, the intensity of the radiation decreases proportionally to the inverse of the square of the distance. If r designates a distance between a radioactive source and the device, the intensity of the radiation, between the device and the source, varies as $$\frac{1}{r^2}$$

The intensity may correspond to a flux (number of particles per unit time) or to a fluence rate (number of particles per unit time and area). The count rate of each detector varies linearly as a function of the intensity of the radiation emitted by the source. Knowing the direction in which the source is located, by implementing one of the embodiments described above, it is possible to estimate a distance between the device and the source, via movement, by a known distance, with respect to the source, and via measurement of the variation in the count rate of at least one detector. The movement with respect to the source is made in the direction pointing toward the source. Knowing the distance traveled, combined with measurement of the count rates before and after the movement, makes it possible to evaluate the distance between the device and the source.

Figure 8:
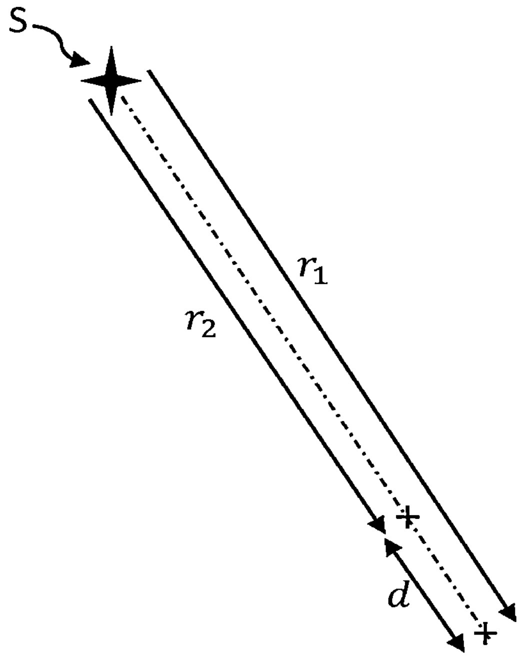
FIG. 8 illustrates implementation of the device to estimate a distance with respect to a radioactive source the orientation of which with respect to the device has been determined beforehand.

Thus, when the device is moved, in a rectilinear direction, pointing toward the source, between a position $r_1$ and a position $r_2$, see FIG. 8:

$$\frac{N_1}{N_2} = \frac{r_2^2}{r_1^2} \tag{3}$$

where $N_1$ and $N_2$ are the count rates measured, by a detector (and preferably the same detector) when the device occupies the positions $r_1$ and $r_2$ with respect to the source, respectively. If d is a distance between $r_1$ and $r_2$, then $r_2=r_1+d$.

d is a signed distance, which is negative if $r_2<r_1$ and positive if $r_2>r_1$.

Development of (3) leads to:

$$(N_2 - N_1)r_1^2 + 2r_1N_2d + N_2d^2 = 0 \tag{4}$$

$N_2$ and $N_1$ are measured. d may be predetermined or measured. When d is predetermined, the user bearing the device moves, along the direction pointing toward the source, by a predetermined distance, for example 50 or 60 cm, this corresponding to one increment. Alternatively, the device is equipped with a geolocating unit 23, allowing the distance d traveled between the positions $r_2$ and $r_1$ to be measured.

The processing unit 20 is programmed to estimate $r_1$ by solving (4).

Count rates follow a Poisson distribution. Expression (4) may be employed provided that the difference between $N_1$ and $N_2$ is greater than a threshold, so as to be representative from a statistical point of view. Assuming that $N_1$ and $N_2$ are high enough to follow a Gaussian distribution, and a risk of false positive of 2.5%, the difference between $N_1$ and $N_2$ is considered statistically significant when $$|N_1 - N_2| > (1-\alpha)\sqrt{2N_2} \tag{5}$$

with $1-\alpha=1.96$.

Beyond the statistical threshold $(1-\alpha)\sqrt{2N_2}$, the difference between $N_1$ and $N_2$ has a 97.5% probability of being statistically representative and of not being due to statistical fluctuations.

Figure 9A:
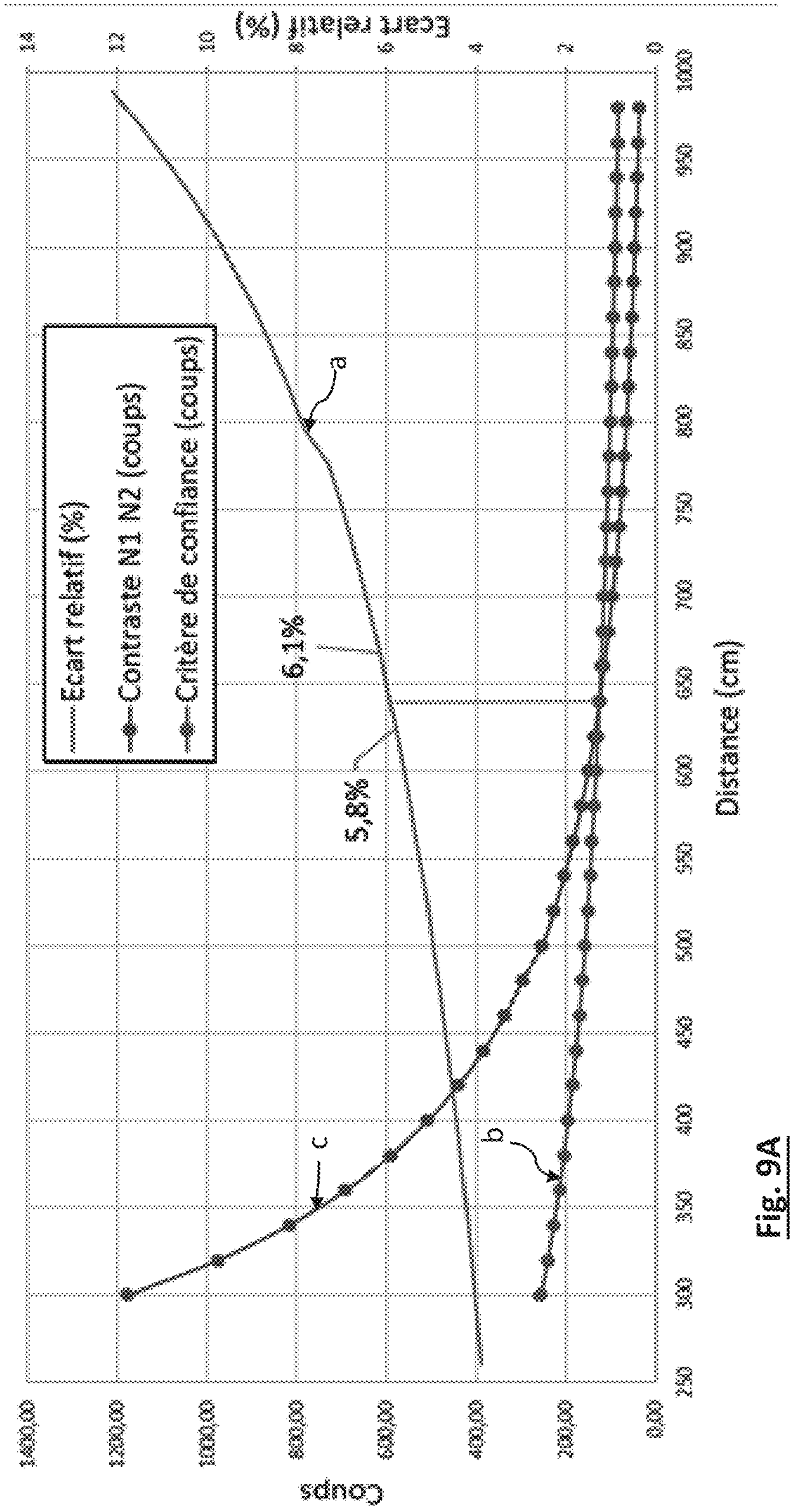
FIGS. 9A and 9B show experimental measurements made to estimate the distance between the device and the source.

A feasibility trial has been carried out using a BGO inorganic scintillator detector of 25.4 mm×25.4 mm (1 inch by 1 inch). The scintillator was moved, in increments of 20 cm, in a straight line, with respect to a point $^{137}Cs$ source. The $^{137}Cs$ source generated an equivalent dose rate of 10 $\mu Sv \cdot h^{-1}$, and was placed 5 meters from the detector. The distance between the detector and the source varied between 10 m and 2 m. FIG. 9A shows the difference (or contrast) $N_2-N_1$ detected by the detector (left-hand y-axis–unit counts per second) as a function of the distance between the source and the detector (x-axis–unit cm): curve a).

The relative difference $$\frac{N_2 - N_1}{N_1}$$

was also computed, the scale of the latter being plotted on the right-hand y-axis–unit %. Curve b) corresponds to the variation in the relative difference as a function of distance.

At each measurement point, the statistical threshold as defined in (5) was computed. Curve c) shows the variation in the statistical threshold as a function of distance.

The difference between the count rates $N_2-N_1$ may be considered to be statistically representative when $N_2-N_1>(1-\alpha)\sqrt{2N_2}$. In this example, $N_2-N_1$ crosses the statistical threshold at a threshold distance $d_s$ of 6.5 m from the source.

The differential measurement $N_2-N_1$ may thus be considered to allow an estimation of the distance between the detector and source over a distance range of between 0 and 6.5 m, i.e. up to the threshold distance. This corresponds to a relative difference of about 6%.

Figure 9B:
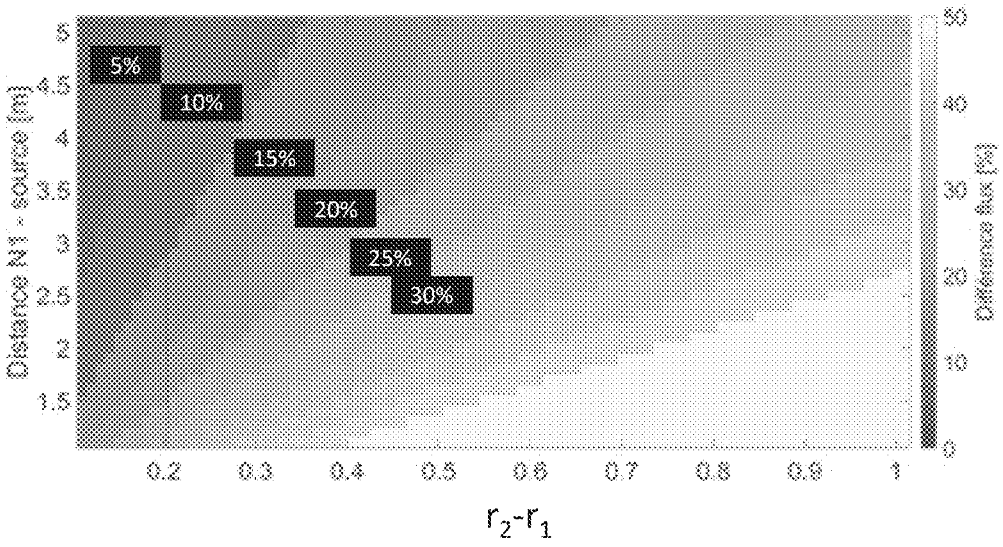

FIG. 9B shows the relative difference $$\frac{N_2 - N_1}{N_1}$$

(grayscale levels) as a function of the variation in distance $r_1-r_2$ (x-axis–unit meter–$r_2<r_1$), for various distances $r_1$ with respect to the source (y-axis–unit meter). The more $r_1$ increases, the greater the distance variation $r_1-r_2$ must be to observe a relative difference greater than statistical fluctuations. This figure shows that the distance $r_1-r_2$ is preferably greater than 20 cm, to obtain a relative difference greater than 6%, the latter corresponding to the statistical threshold: see FIG. 9A.

FIGS. 9A and 9B show that beyond a certain threshold distance, the estimated distance should not be considered valid due to the associated uncertainty. The threshold distance depends on the detector, and in particular on its sensitivity, and may be determined experimentally as described with reference to FIG. 9A. When, after the direction pointing toward the source has been determined, the device is used to estimate the distance between the device and the source, the processing unit may be programmed to invalidate the estimated distance if the latter is greater than the predetermined threshold distance.

To determine the distance between the source and the device, the detector closest to the source will preferably be used, since said detector is not subject to attenuation of the radiation emitted by the source by the other detectors.

FIG. 10 schematically shows the main steps of a method for determining a direction between a measuring device and a source, and possibly an estimate of the distance between the source and the device.

Step 100: measuring the count rates of the detectors forming the device.

When the device comprises more than 2 detectors, step 120 may be implemented directly.

Step 110: this step is implemented in particular when the device comprises only 2 detectors. The device is rotated around iso-centroid O and perpendicular to the holder. The count rate of each detector is measured.

Step 120: Depending on the measurements performed in step 100 and the optional step 110, computing the centroid of the positions of each detector weighted by the count rates measured by each respective detector.

Step 130: Depending on the position of the centroid resulting from step 120, determining a direction pointing toward the source.

Step 140: moving the device in the direction resulting from step 130 by a predetermined distance or any distance.

Step 150: when the distance of movement of step 140 is arbitrarily chosen, estimating the distance by means of the geolocating unit or by means of the inertial measurement unit, beginning from a starting position.

Step 160: measuring the count rate of a detector of the device.

Step 170: based on the measurement resulting from step 160 and on the measurement made by the detector before the movement, for example in step 100 (or 110), estimating a distance between the source and the device.

Step 180: comparing the estimated distance with the threshold distance $d_s$, so as to validate or invalidate the measurement. The threshold distance was determined beforehand.

The device described above may be used while being carried by a user. It may also be mounted on an autonomous vehicle. In this case, the direction determined by the device is transmitted to a control unit of the vehicle, so that the vehicle may be steered depending on this direction. Use of a vehicle is recommendable when operating in hostile environments, for example in the presence of contamination or high levels of radiation.

The invention claimed is:

1. A device for estimating a direction pointing toward a radioactive source, the radioactive source emitting radiation composed of gamma particles or X-rays or neutrons, the device comprising:

a holder; and at least two radiation detectors, each detector being configured to generate a detection signal, depending on a number of particles detected by the detector, wherein each detector is assigned a position, the detectors being placed around a center corresponding to an iso-centroid of each position, a centroid of each position being equally weighted, the device further comprising processing circuitry configured to compute a centroid of each position weighted by the detection signal measured by the detector occupying said position;

depending on the centroid, estimate a direction pointing toward the radioactive source, corresponding to a direction between the device and the radioactive source;

store the detection signals of the detectors at a first time;

store the detection signals of the detectors at a second time, after the first time;

take into account a position of each detector at the first time and at the second time; and compute the centroid of the respective positions of the detectors at each time, weighted by the detection signals measured by each detector at each time, respectively.

2. The device as claimed in claim 1, further comprising at least three non-aligned detectors.

3. The device as claimed in claim 1, further comprising an orienting unit configured to estimate a change in the position of the detectors between the first time and the second time.

4. The device as claimed in claim 1, wherein the device further comprises a display, connected to the processing circuitry, and configured to display the direction pointing toward the radioactive source.

5. The device as claimed in claim 1, wherein at least one detector or each detector comprises a detection scintillator.

6. The device as claimed in claim 5, wherein at least one detector or each detector comprises an inorganic detection scintillator.

7. The device as claimed in claim 1, and wherein the processing circuitry is further configured to:

take into account a distance of movement of the device between two successive measurement times, in the direction pointing toward the radioactive source;

measure the detection signals generated by a detector of the device at the two successive measurement times; and estimate a distance between the device and the source depending on the distance of movement and on the detection signals measured at each time.

8. The device as claimed in claim 7, further comprising a geolocating unit configured to measure the distance of movement of the device between the two successive measurement times.

9. A method for determining a direction pointing toward a radioactive source using the device as claimed in claim 1, the method comprising:

a) measuring detection signals with each detector;

b) computing a centroid of each position weighted by the signal measured by the detector occupying said position; and c) estimating the direction pointing toward the source depending on the computed centroid.

10. The method as claimed in claim 9, wherein:

the step a) comprises:

measuring a detection signal resulting from at least two detectors at a first time; and measuring the detection signal resulting from said detectors at a second time;

the step b) comprises taking into account a position of each detector at the first time and at the second time; and the step c) comprises computing a centroid of the respective positions of the detectors at each time, weighted by the detection signals measured by each detector at each time, respectively.

11. The method as claimed in claim 10, wherein between the first time and the second time the device rotates about the iso-centroid, an angle of rotation being predetermined and/or measured.

12. The method as claimed in claim 9, further comprising displaying the direction pointing toward the radioactive source.

13. The method as claimed in claim 9, further comprising:

d) moving the device between two positions along the direction pointing toward the source, by a distance of movement (d);

e) at each position, measuring a detection signal by means of a detector; and f) taking into account the distance of movement and the detection signal measured at each position to estimate a distance between the radioactive source and the device.

14. The method as claimed in claim 13, further comprising:

g) comparing the distance between the source and the device, estimated in step f), with a predetermined threshold distance; and h) depending on the comparison, validating or invalidating the estimated distance between the radioactive source and the device.

* * * * *